US010956501B2

(12) United States Patent
Kizhakkel et al.

(10) Patent No.: US 10,956,501 B2
(45) Date of Patent: Mar. 23, 2021

(54) NETWORK-WIDE, LOCATION-INDEPENDENT OBJECT IDENTIFIERS FOR HIGH-PERFORMANCE DISTRIBUTED GRAPH DATABASES

(71) Applicant: Cisco Technology, Inc., San Jose, CA (US)

(72) Inventors: Vinit Rajan Kizhakkel, San Jose, CA (US); Jeffrey Y.D. Lo, Cupertino, CA (US); Pratap Pereira, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/749,460

(22) Filed: Jan. 22, 2020

(65) Prior Publication Data

US 2020/0159775 A1 May 21, 2020

Related U.S. Application Data

(63) Continuation of application No. 15/288,282, filed on Oct. 7, 2016, now Pat. No. 10,585,943.
(Continued)

(51) Int. Cl.
*G06F 16/901* (2019.01)
*G06F 16/28* (2019.01)

(52) U.S. Cl.
CPC ........ *G06F 16/9024* (2019.01); *G06F 16/282* (2019.01); *G06F 16/9027* (2019.01)

(58) Field of Classification Search
CPC . G06F 16/9024; G06F 16/9027; G06F 16/282
See application file for complete search history.

(56) References Cited

U.S. PATENT DOCUMENTS 7,657,543 B1  2/2010 Caronni et al.
7,774,642 B1  8/2010 Johnsen et al.
(Continued)

OTHER PUBLICATIONS

Eickler, et al., "Finding Data in the Neighborhood", Proceedings of the 23rd VLDB Conference, 1997, 10 pages, Athens, Greece.
(Continued)

*Primary Examiner* — James Trujillo
*Assistant Examiner* — Michal Bogacki
(74) *Attorney, Agent, or Firm* — Behmke Innovation Group LLC; James M. Behmke; Jonathon P. Western

(57) ABSTRACT

In one embodiment, an operating system (on a computer device in a network of computer devices) interfaces with a distributed graph database that is distributed across the network of computer devices, and executes an application that has one or more parent data constructs that reference one or more child objects within the distributed graph database. Specifically, the one or more child objects each have a location-independent object identifier (OID) having at least: a) an OID-identifier (OID-ID) assigned upon creation to each particular child object by a data source of the location-independent OID; b) an OID-source structure that uniquely identifies the data source of the location-independent OID within the network of computer devices; and c) an OID-pointer indicative of a relative location of the particular child object in a memory mapped region. Accordingly, the operating system accesses the child objects (e.g., for an application) based on the location-independent OID.

20 Claims, 12 Drawing Sheets

Related U.S. Application Data

(60) Provisional application No. 62/259,618, filed on Nov. 24, 2015.

(56) References Cited

U.S. PATENT DOCUMENTS

| | | | |
|---|---|---|---|
| 8,484,259 | B1 | 7/2013 | Makkar et al. |
| 8,832,154 | B1 | 9/2014 | Srinivasan et al. |
| 9,015,212 | B2 | 4/2015 | David et al. |
| 9,043,567 | B1 | 5/2015 | Modukuri et al. |
| 9,606,708 | B2 | 3/2017 | Matas et al. |
| 2004/0111469 | A1 | 6/2004 | Manion et al. |
| 2007/0079004 | A1 | 4/2007 | Tatemura et al. |
| 2008/0043821 | A1 | 2/2008 | Brockhage et al. |
| 2008/0154978 | A1 | 6/2008 | Lemar et al. |
| 2010/0040227 | A1 | 2/2010 | Stephens, Jr. |
| 2011/0320411 | A1 | 12/2011 | Henderson |
| 2012/0311515 | A1 | 12/2012 | Zolotov et al. |
| 2013/0006989 | A1 | 1/2013 | Plattner et al. |
| 2014/0310384 | A1 | 10/2014 | Choi et al. |
| 2014/0365531 | A1 | 12/2014 | Soundararajan et al. |
| 2015/0066847 | A1 | 3/2015 | Beard et al. |
| 2015/0302015 | A1 | 10/2015 | Saurel et al. |
| 2015/0319242 | A1 | 11/2015 | Olster et al. |
| 2016/0246849 | A1 | 8/2016 | Frampton et al. |
| 2017/0118104 | A1 | 4/2017 | Li et al. |
| 2018/0013827 | A1 | 1/2018 | Kamei et al. |

OTHER PUBLICATIONS

"Globally unique identifier", https://en.wikipedia.org/wiki/Globally_unique_identifier, Feb. 22, 2016, 7 pages, Wikimedia Foundation, Inc.

"Products & Services", http://optumsoft.com/products-services/, Feb. 22, 2016, 10 pages, OptumSoft.

"DMTF Standards for Federating CMDBs and other Management Data Repositories" CMDB Federation, https://www.dmtf.org/sites/default/files/DMTF_Standards_for_Federating_CMDBs_20090910v2.pdf, Sep. 10, 2009, 24 pages. Distributed Management Task Force, Inc.

"Configuration Management Database (CMDB) Federation Specification", http://www.dmtf.org/sites/default/files/standards/documents/DSP0252_1.0.0.pdf, Jun. 22, 2009, 73 pages, Distributed Management Task Force, Inc.

Schmidt, D.C., Henney, K., Buschmann, F., Pattern-Oriented Software Architecture: A Pattern Language for Distributed Computing, May 2007, John Wiley & sons, 4th Volume, Chapter 5.10—"Crossing the Object-Oriented/Relational Divide", 2007.

Allied Telesis, Inc., "7 Reasons to stack your core chassis", pp. 1-8, 2014.

International Telecommunication Union, Information technology—procedures for the operation of object identifier registration authorities; General procedures and top arcs of the international object identifier tree, ITU-T Telecommunication Standardization Sector of ITU, X.660 Jul. 2011, pp. 3-13.

| ID 810 | FLAGS 820 | OID-ID/OID-SOURCE 830 |
|---|---|---|
| ... | ... | ... |

TABLE OF CONTENTS 800

FIG. 8

NETWORK-WIDE, LOCATION-INDEPENDENT OBJECT IDENTIFIERS FOR HIGH-PERFORMANCE DISTRIBUTED GRAPH DATABASES

RELATED APPLICATION

This application is a continuation application of U.S. patent application Ser. No. 15/288,282, filed Oct. 7, 2016, entitled NETWORK-WIDE, LOCATION-INDEPENDENT OBJECT IDENTIFIERS FOR HIGH-PERFORMANCE DISTRIBUTED GRAPH DATABASES, by Kizhakkel, et al., which claims priority to U.S. Provisional Application No. 62/259,618, filed on Nov. 24, 2015, entitled MODELING AND REPLICATION OF NETWORK-WIDE, LOCATION-INDEPENDENT OBJECT IDENTIFIERS FOR HIGH-PERFORMANCE DISTRIBUTED GRAPH DATABASES, by Kizhakkel, et al., the contents of each of which are herein incorporated by reference.

TECHNICAL FIELD

The present disclosure relates generally to computer network operating systems, and, more particularly, to modeling and replication of network-wide, location-independent object identifiers for high-performance distributed graph databases.

BACKGROUND

An operating system (OS) is system software that manages computer hardware and software resources, and provides common services for computer programs. General operating systems perform basic tasks, such as recognizing input from the keyboard, sending output to the display screen, keeping track of files and directories on the disk, and controlling peripheral devices such as disk drives and printers.

A computer network operating system, specifically, is a specialized operating system for a network device such as a router, switch, firewall, and so on. For instance, the Internetwork Operating System (IOS) available from Cisco Systems, Inc. is an example computer network operating system, where the IOS software used on routers and switches provides a package of routing, switching, internetworking, and telecommunications functions integrated into a multitasking operating system. For example, a computer network operating system can provide IP routing (basic, IPv4, IPv6, etc.) for data, voice, video, etc., and can provide security services and virtual private network (VPN) services as well as a myriad of other features, such as tunneling protocols, path reservation protocols, connectivity verification protocols, and so on. Generally, computer network operating systems function on various classes of network platforms. Such platforms include routers, switches (e.g., ATM switches, LAN and WAN switches, etc.), file servers, intelligent hubs, personal computers, and any other devices that function within an internetwork.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example table of contents.

DESCRIPTION OF EXAMPLE EMBODIMENTS

Overview

According to one or more embodiments of the disclosure, an operating system (on a computer device in a network of computer devices) interfaces with a distributed graph database that is distributed across the network of computer devices, and executes an application that has one or more parent data constructs that reference one or more child objects within the distributed graph database. Specifically, the one or more child objects each have a location-independent object identifier (OID) having at least: a) an OID-identifier (OID-ID) assigned upon creation to each particular child object by a data source of the location-independent OID; b) an OID-source structure that uniquely identifies the data source of the location-independent OID within the network of computer devices; and c) an OID-pointer indicative of a relative location of the particular child object in a memory mapped region. Accordingly, the operating system accesses the one or more child objects (e.g., for an application) based on the location-independent OID.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
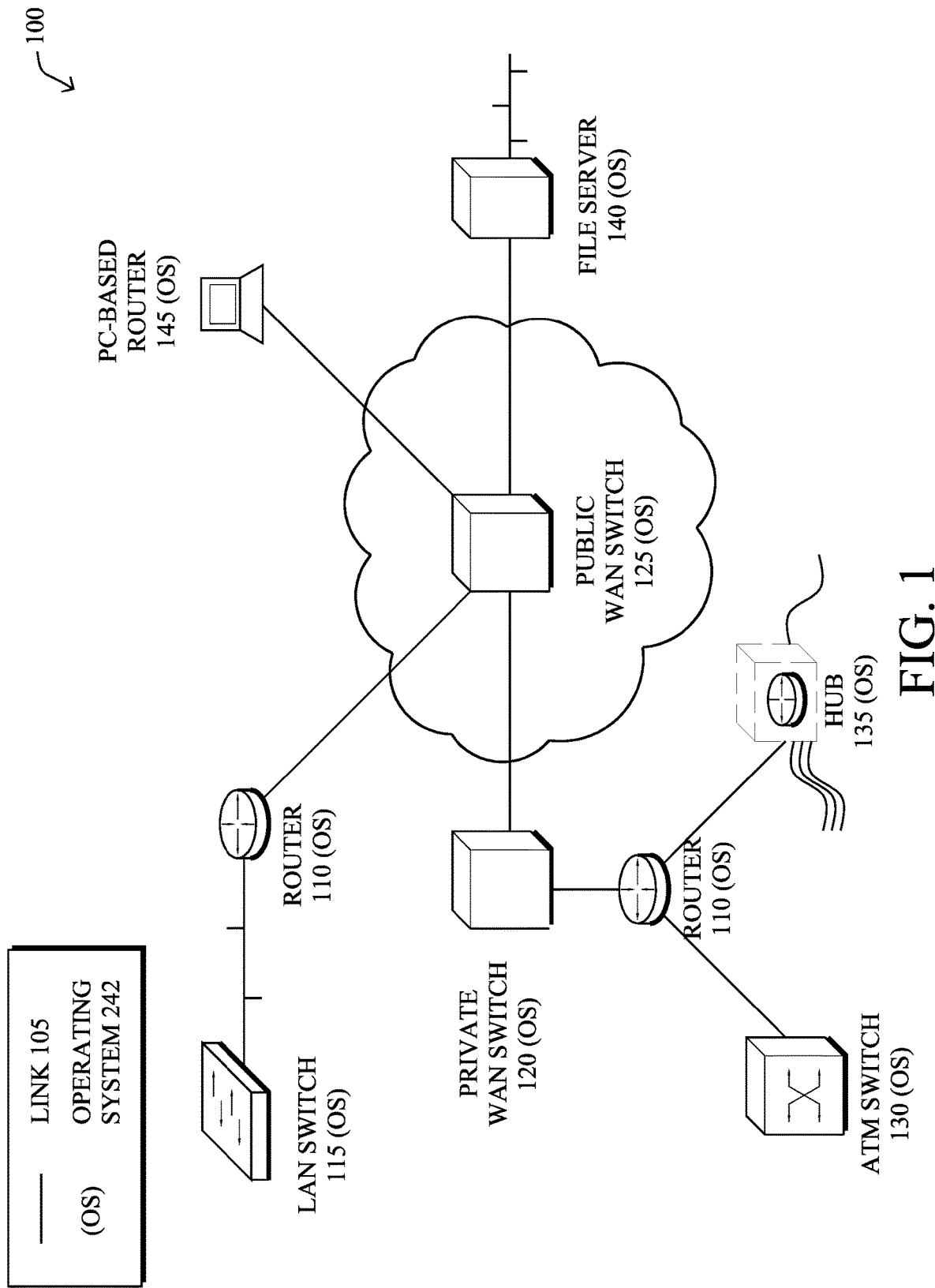
FIG. 1 illustrates an example communication network.

FIG. 1 is a schematic block diagram of an example computer network 100 illustratively comprising nodes/devices, such as a plurality of routers, switches, and so on interconnected by links 105 or networks, as shown. For instance, such devices may illustratively comprise routers 110, LAN switches 115, private WAN switches 120, public WAN switches 125, ATM switches 130, hubs 135, file servers 140, PC-based routers 145, etc. Notably, each device may have an operating system (OS) 242, as described below.

Data packets (e.g., traffic/messages) may be exchanged among the nodes/devices of the computer network over links 105 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. The links themselves may be wired links, wireless links, powerline communication links, and so on. Those skilled in the art will understand that any number of nodes, devices, links, etc. may be used in a computer network, and that the view shown herein is for simplicity.

Figure 2:
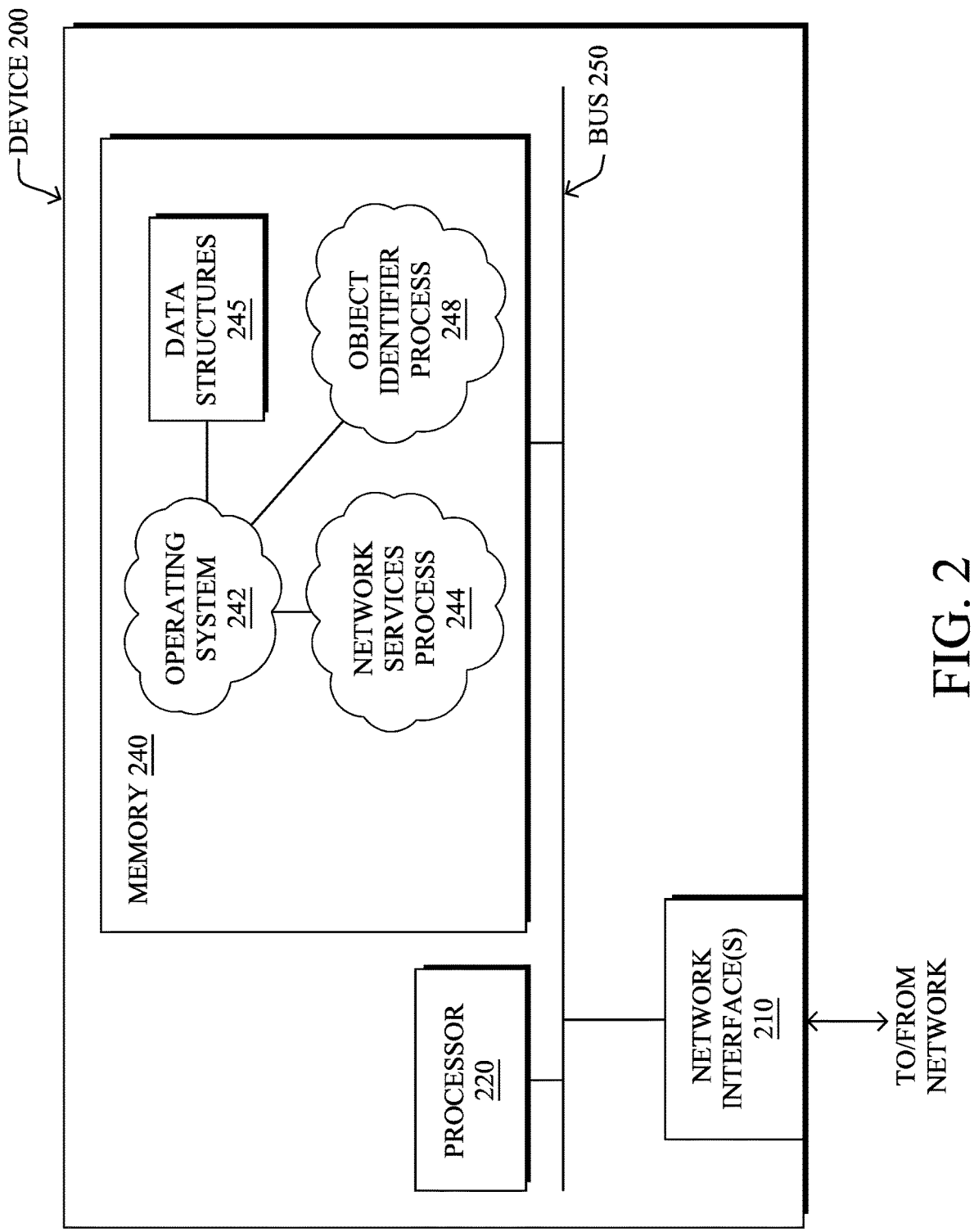
FIG. 2 illustrates an example computing device.

FIG. 2 is a schematic block diagram of an example node/device 200 that may be used with one or more embodiments described herein, e.g., as any of the devices of network 100, or any other computing device that may perform the operating system techniques described herein (e.g., routers, switches, etc.). Device 200 comprises a one or more network interfaces 210, one or more processors 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note that the nodes may have multiple types of network connections 210, e.g., wireless and wired/physical connections, and that the view herein is merely for illustration.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the device by, among other things, invoking operations in support of software processes and/or services executing on the device. These software processes and/or services may include one or more network service processes 244, such as routing processes, switching processes, traffic engineering processes, security processes, and so on, any of which optionally being alternatively be located within individual network interfaces. An illustrative "object identifier" process 248 may also be present on the device 200, the functionality of which being detailed further below.

Note that while dynamic processes are shown in centralized memory 240, alternative embodiments provide for the process to be specifically operated within the operating system 242, or within network interfaces 210. It will also be apparent to those skilled in the art that other processor and memory types, including various computer-readable media, may be used to store and execute program instructions pertaining to the techniques described herein. Further, while the description illustrates various processes, it is expressly contemplated that various processes may be embodied as modules configured to operate in accordance with the techniques herein (e.g., according to the functionality of a similar process). Moreover, while the processes have been shown separately, those skilled in the art will appreciate that processes may be routines or modules within other processes.

As an illustrative example of a network service process 244, a routing process may include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Other types of functional processes may be used by the device 200, and a routing process is merely one example that is not meant to be limiting to the embodiments herein.

——Network-Wide, Location-Independent Object Identifiers——

Figure 3:
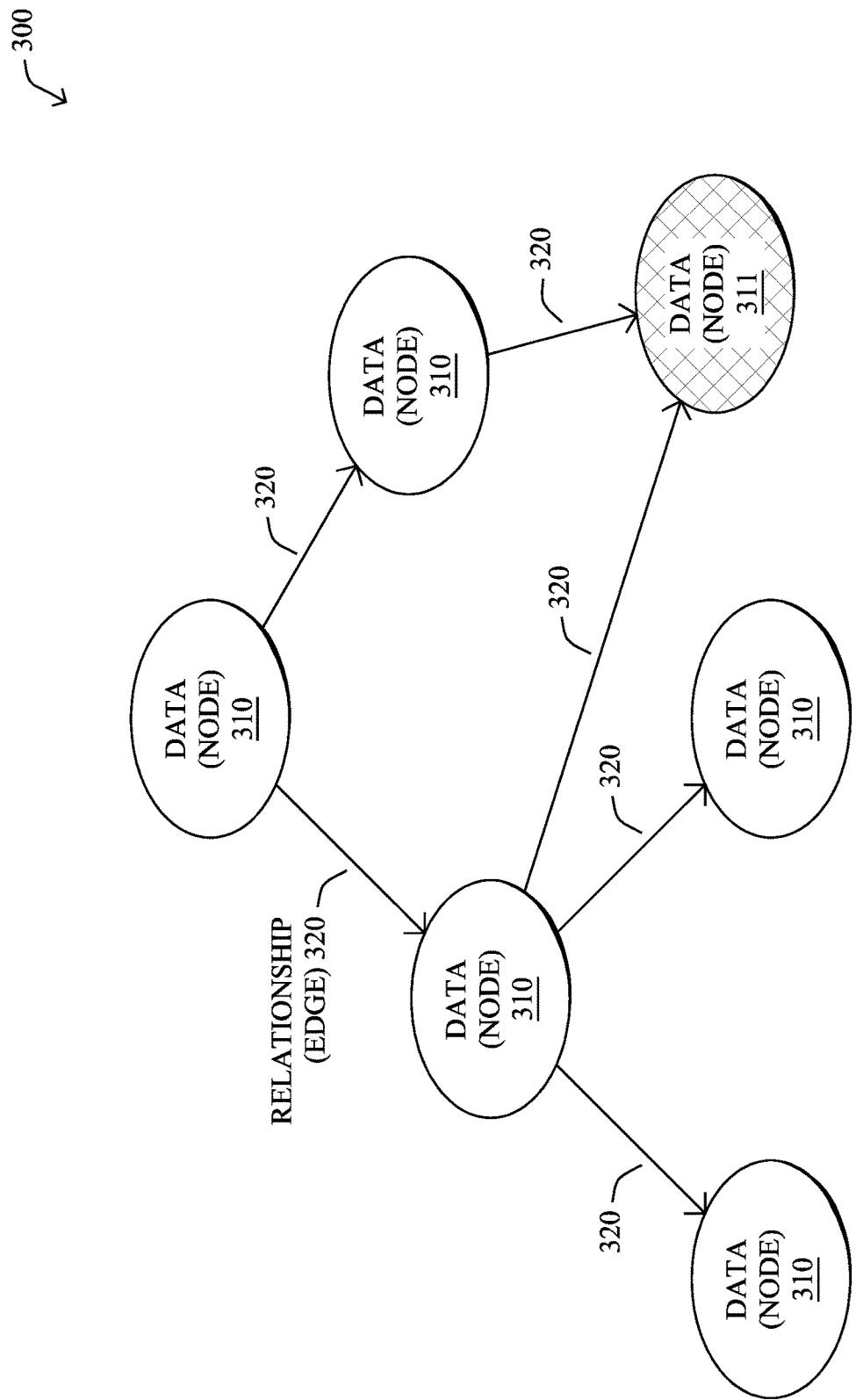
FIG. 3 illustrates an example graph database.

As will be understood by those skilled in the art, a graph database stores data in the form of "nodes" that are interconnected via "edges" that define the relationship between them. Nodes contain information about different objects stored in the database and the edges can be used to travel from one node to another based on certain criteria. FIG. 3 illustrates an example graph database 300, where data (nodes) 310 are interconnected via relationships (edges) 320. In a distributed graph database, the data 310 may be maintained locally on the device executing an application, or else on a different (e.g., remote) device, such as, for example, data node 311, which may be a reference to an object stored or maintained by a different application or device.

In the realm of network operating systems and their manageability, high-performance in-memory distributed databases are used to store critical configuration and/or operational data. Such business-critical data must be modeled using "database objects" that are stored efficiently, uniquely identifiable, capable of being efficiently distributed, and consumed seamlessly on other peer-systems that are part of the network, blazing fast in terms of look-ups (searches) and traversals, and readily available in case of failures (redundancy).

The techniques herein achieve the above requirements with high performance using location independent Object Identifiers (OID's) that model hierarchical relationships between the nodes in graph databases on multi-chassis networking devices (switches, routers, manageability agents, etc.) that are interconnected in a computer network (e.g., an enterprise network).

In particular, the techniques herein provide a new approach to model unique object identifiers that can be distributed (replicated) and used transparently across a distributed multi-chassis networking environment (different, physically separate devices), while simultaneously being efficient in terms of memory and bandwidth utilization. In other words, it provides a network-wide representation of objects. The techniques herein also provide efficient storage and caching support for object references, and enables fast traversals and lookups almost as fast as pointer dereferences for databases whose schema does not support defining pointers. Further, the techniques herein use a combination of unique identifiers and relative object locations to define object references and maintain bi-directional mappings between them.

Specifically, according to one or more embodiments described in detail below, an operating system (on a computer device in a network of computer devices) interfaces with a distributed graph database that is distributed across the network of computer devices, and executes an application that has one or more parent data constructs that reference one or more child objects within the distributed graph database. Specifically, the one or more child objects each have a location-independent object identifier (OID) having at least: a) an OID-identifier (OID-ID) assigned upon creation to each particular child object by a data source of the location-independent OID; b) an OID-source structure that uniquely identifies the data source of the location-independent OID within the network of computer devices; and c) an OID-pointer indicative of a relative location of the particular child object in a memory mapped region. Accordingly, the operating system accesses the one or more child objects (e.g., for an application) based on the location-independent OID.

Illustratively, the techniques described herein may be performed by hardware, software, and/or firmware, such as within and/or through coordination with the operating system 242, particularly the object identifier process 248, which may contain computer executable instructions executed by the processor 220 to perform functions relating to the techniques described herein. Note that while reference is made to functionality within the operating system 242, portions of the techniques described herein may be performed by any combination of various processes and applications, and it is also expressly contemplated that various processes may be embodied as modules configured to operate in accordance with the techniques herein (e.g., according to the functionality of a similar process). Further, while processes may have been shown separately, those skilled in the art will appreciate that processes may be routines or modules within other processes (e.g., part of operating system 242).

Operationally, an example schema layer provided by an interface definition language (DL) in an illustrative network operating system for its in-memory graph databases does not allow pointers to be declared in the data model. However, it does allow referring to objects using a construct called the Object Identifier (OID).

As a result, this graph database models its hierarchical relationships (from a parent node to its children) using these OID's. Following are a few examples of OID usage based on the DL schema.

```
type_def medical_record {
    u_int16 temperature;
    u_int32 something;
};
```

The above construct defines a "medical_record" object that has two unsigned integer elements.

```
table_def report_cards {
    ....
    embeds student;
```

```
    key student.marks {
        type avl;
    }
    .....
};
```

The above construct defines a table of type "report_cards" that contains "student" objects (defined below) as records. The records may be inserted in an AVL tree for this type of table.

```
type_def student {
    u_int32 namelen;
    char name[namelen];
    u_int32 marks;
    oid <report_cards> rc_table_oid;
    oid <medical_record> mr_oid;
    list <suspension_data> suspensions;
    list <suspension_data> major_suspensions;
    u_int32 sp_index;
    u_int32 sec_namelen;
    char sec_name[sec_namelen];
    u_int32 sec_marks;
};
```

The above construct defines a "student" object that has several elements like unsigned integers, strings, lists as well as two OID's:

1. oid<report_cards>rc_table_oid;

This defines a reference from a "student" object to a table of type "report_cards" that is defined below. Note that "report_cards" is the name of the type and not the instance of the table. It is possible to have multiple instances of "report_cards" tables in the database through different alphanumeric identifiers.

2. oid<medical_record>mr_oid;

This defines a reference from a "student" object to another separate object of type "medical_record" defined earlier.

Depending on the number and kind of OID's defined in an object, one can create references to multiple disparate tables as well as standalone objects in the database.

Figure 4:
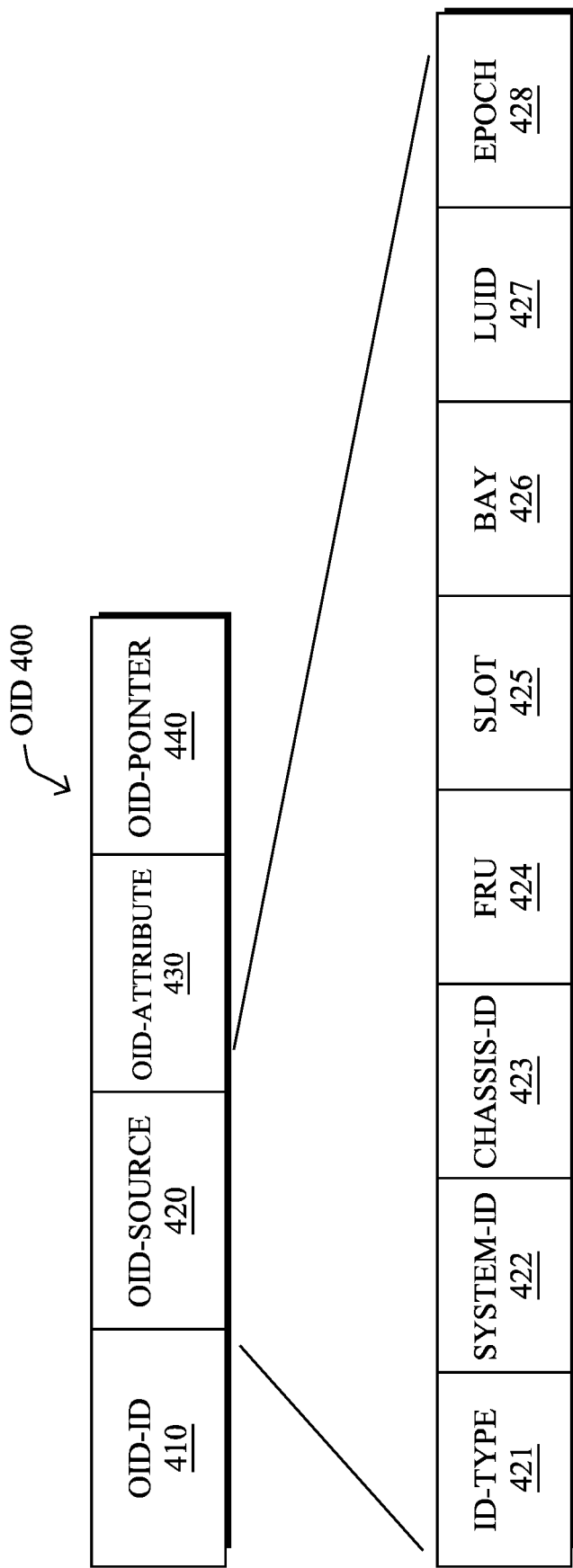
FIG. 4 illustrates an example object identifier (OID)

With reference to FIG. 4, an example object identifier (OID) 400 in accordance with one or more embodiments herein may be described as follows. In particular, an example structure of an OID is shown below:

```
typedef struct oid_struct_ {
    u_int64_t oid_ptr;
    u_int64_t oid_id;
    oid_source_t *oid_source
    u_int8_t oid_attr;
} oid_value_t;
``` where oid_source_t is defined as:

```
typedef struct oid_source_s {
    u_int8_t id_type;
    u_int16_t system_id;
    u_int8_t chassis_id;
    u_int8_t fru;
    u_int8_t slot;
    u_int8_t bay;
    char luid[16];
    u_int8 sso_epoch;
} oid_source_t;
```

In greater detail, and with particular reference to FIG. 4, the OID 400 comprises a plurality of pieces of information that uniquely identify an object in a location-independent manner:

"oid_id" (or OID-ID) 410: A number assigned every time a new OID reference is taken at run time (e.g., a 64-bit monotonically increasing unsigned integer value).

Figure 5:
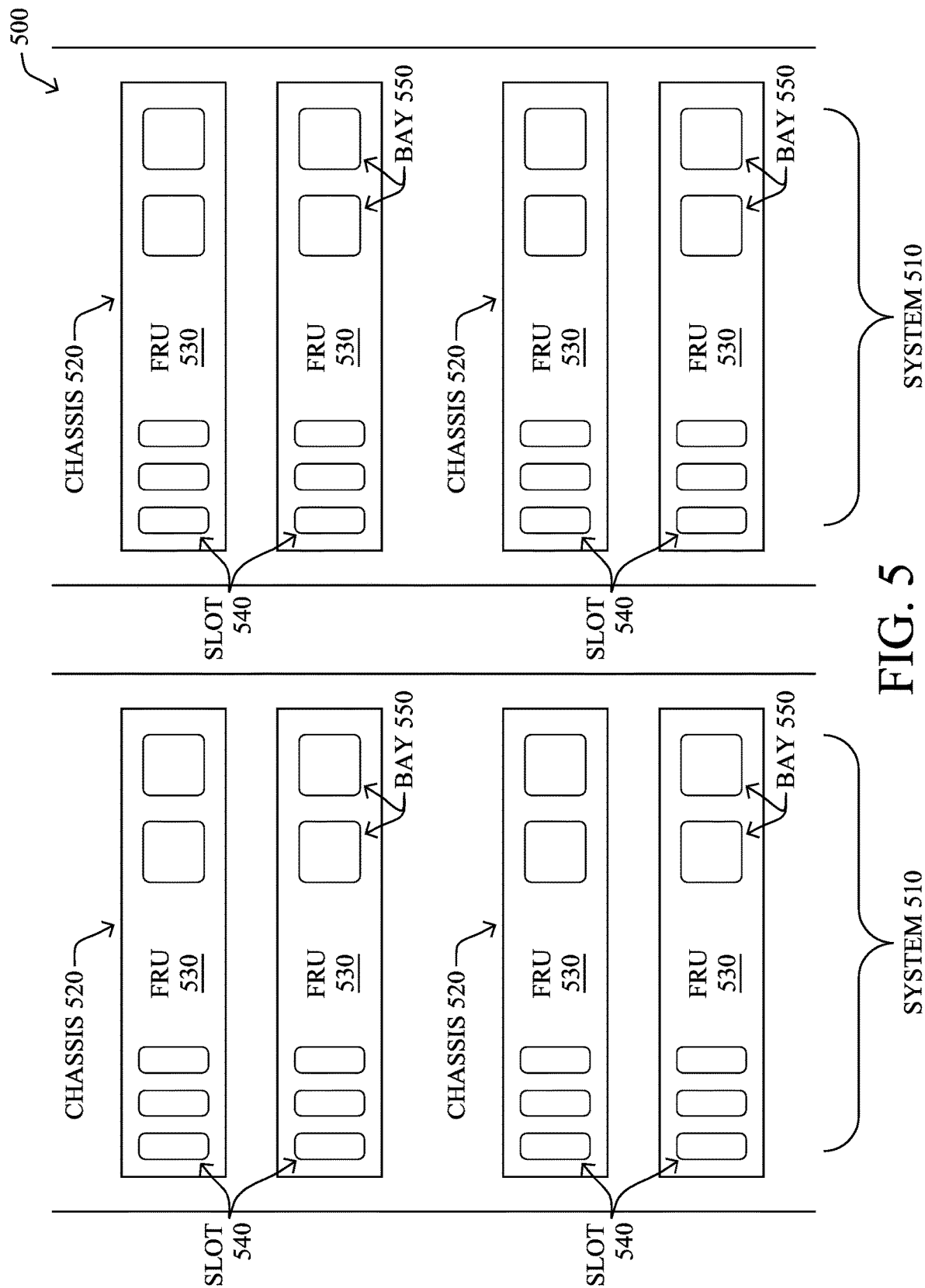
FIG. 5 illustrates an example data source system.

"oid_source" (or OID-SOURCE) 420: With reference to FIG. 5, in a distributed, multi-chassis system 500, databases can reside on different slots 540 and bays 550 on units (e.g., Field Replaceable Units (FRUs)) 530 that could belong to different chassis 520 (indexed by chassis ID). A stack of different chassis can be associated with a unique system ID 510 for the network. Furthermore, objects within these databases could be produced by different applications running on a FRU. Hence, the techniques herein uniquely encode the data source of an OID. Referring again to FIG. 4, the oid_source 420 is a pointer to a structure that contains the following information to uniquely identify the location and owner of the object:

id_type 421: (e.g., 1 byte) Reserved to introduce new id types in the future and transition.

system_id 422: (e.g., 2 bytes) identifier for a multi-chassis stack in the network.

chassis_id 423: (e.g., 1 byte) identifier for a chassis within a multi-chassis stack in a network.

fru 424: (e.g., 1 byte) identifier for a Route Processor, Forwarding, Processor or Line card in a chassis.

slot 425: (e.g., 1 byte) identifier for the physical slot on the chassis where the fru is inserted.

bay 426: (e.g., 1 byte) identifier for the physical bay on the chassis where the fru is inserted.

luid 427: (e.g., 16 byte) compressed alphanumeric representation to identify the type of object. For example: the logical unit (luid) for the type "student" is different from that for the type "medical_record". The luid is generated by the compiler during the build process.

sso_epoch 428: (e.g., 1 byte) represents the number of process restarts.

The above fields together help determine exactly where a particular object was created in the network. The oid_source thus identifies the exact location of the origin of the object. Together, the tuple of oid_id and oid_source uniquely define a location-independent object identity that can be used in a non-overlapping manner across databases with other references produced at runtime in a distributed system. The OID 400 may also illustratively comprise:

"oid_attr" (or OID-ATTRIBUTE) 430: (e.g., 1 byte) This defines whether the OID is a reference to an object or a set of objects (e.g., a table, list, etc.).

Figure 6:
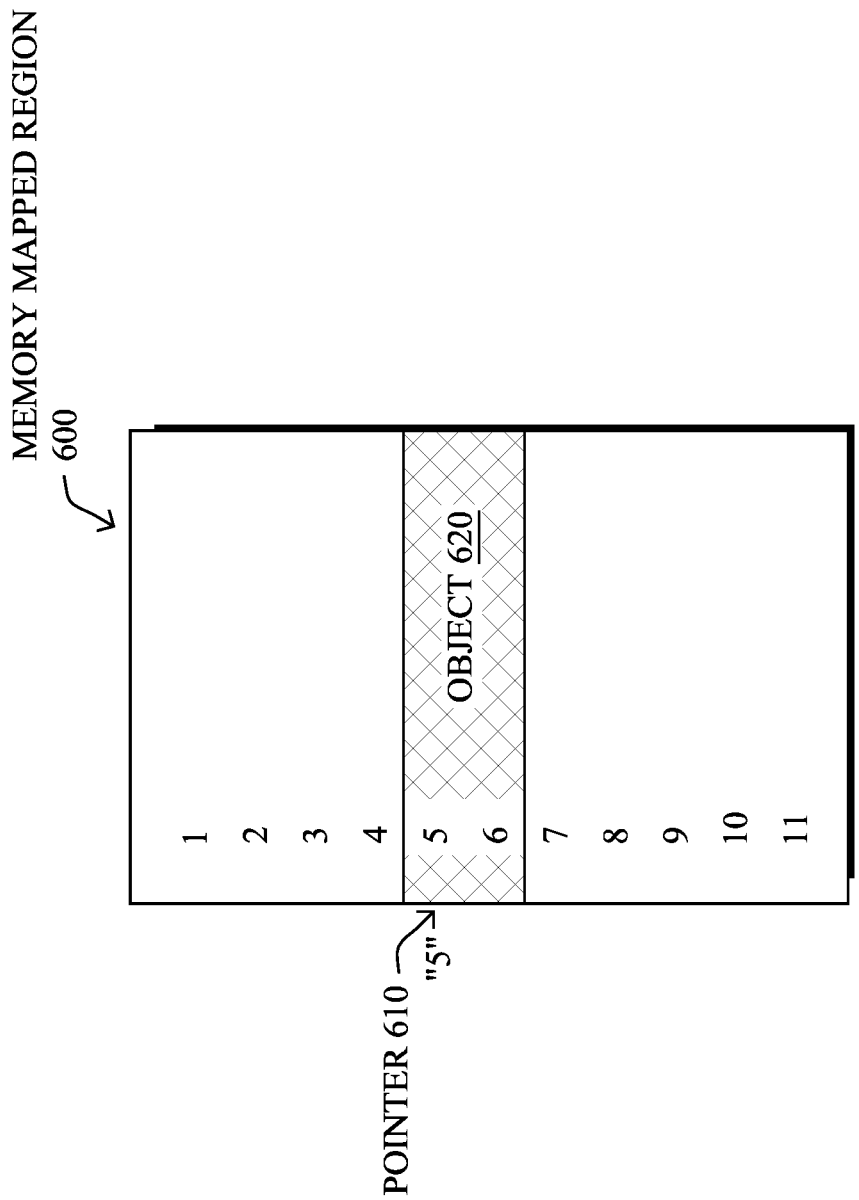
FIG. 6 illustrates an example memory mapped region.

"oid_ptr" (or OID-POINTER) 440: This is the cached relative location of the "referred" object or table in a memory mapped region. FIG. 6 illustrates the concept of a pointer 610 into a memory mapped region 600, such as a pointer to memory location "5" within the mapped region, indicating the relative location of an object 620.

A total of 42 bytes (1 byte added for an oid_source pointer) is thus used to uniquely identify an object. This is much more memory efficient compared to any string based URI approaches or CORBA IOR's (Common Object Request Broker Architecture interoperable object references, as will be understood). Moreover, in one or more embodiments, an OID is not generated for an object until an application specifically requests a reference to it. This is a far better than incurring the additional performance and memory overhead of generating and storing IOR's for each object, which is what CORBA does for CORBA objects.

Regarding mapping an OID reference to an object in the database at the data source, according to the techniques herein, at run time, when a reference is created from the parent to the child object, an oid_id is auto-generated and combined with the oid_source to uniquely encode an identifier for the reference. The oid_ptr value stores the location of the child relative to the beginning of the memory mapped region. This is a 64 bit unsigned value. The child object also gets encoded with the same oid_id and oid_source values.

Figure 7A:
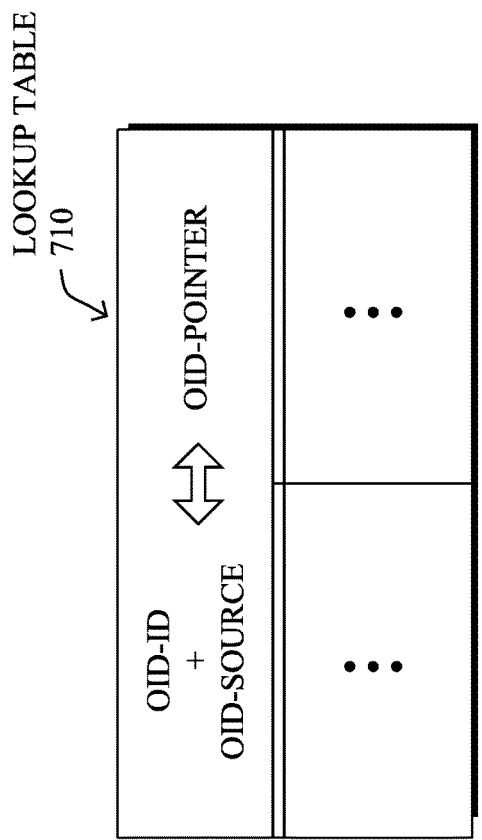
FIGS. 7A-7B illustrate example lookup tables/trees.
Figure 7B:
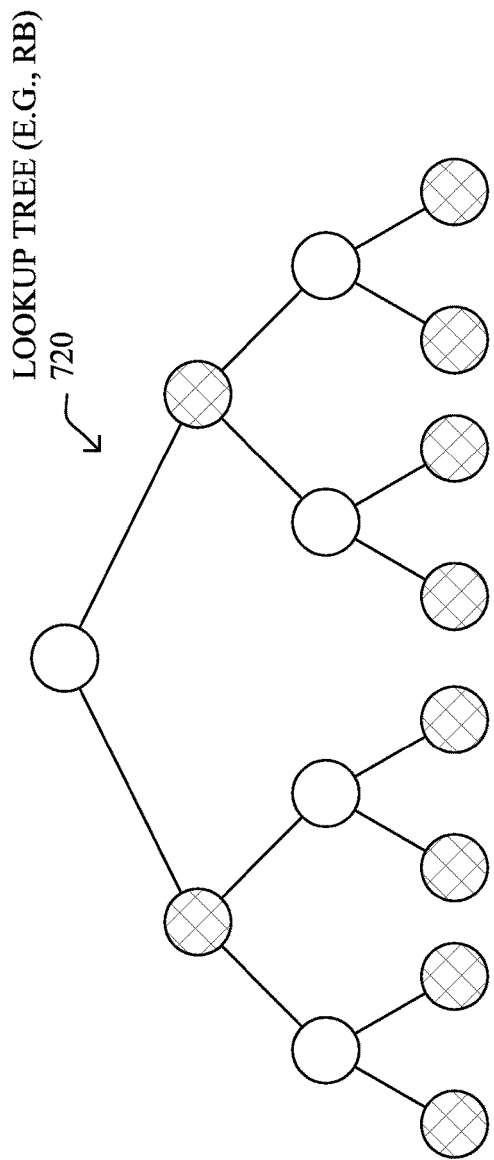

Before these values are cached inside the parent and child objects, bidirectional mappings from an oid_id, oid_source tuple to an oid_ptr value and vice versa are created and stored in two different lookup tables or trees (e.g., red-black (RB) trees or generalized balanced (GB) trees). FIGS. 7A-7B, in particular, illustrate example simplified lookup tables 710 and lookup trees 720, wherein the oid_id, oid_source tuple can be used to lookup the oid_ptr, and vice versa, as may be appreciated by those skilled in the art.

According to the techniques herein, the parent object also caches the oid_ptr, which is the relative address of the child. During graph traversals or searches, this cached oid_ptr value is used to quickly recompute the actual address of the child in memory, thereby allowing access to it almost as quickly as a direct pointer dereference.

Regarding efficiently distributing the OID's across the network (i.e., OID replication from the data source across device boundaries), as described above, the bidirectional mappings are stored in RB trees or GB trees that are optimized for high performance. The tables and types that can be referenced through OID's are dynamic in nature and may need to be replicated across devices boundaries for high-availability and the dissemination of configuration from an external controller. To support this, information about all the dynamic tables and standalone objects in the database that are referred through OID's may be inserted into a top-level Table of Contents (TOC) which is replicated as and when it is updated.

As shown in FIG. 8, each record in the table 800 contains an alphanumeric identifier 810 and some flags 820 along with the oid_id and oid_source tuple 830 of the dynamic table (or object). Moreover, the process that performs the task of replication is aware of the exact database and table into which each record needs to be inserted on the receiving device. When the record is replicated to the corresponding database on the receiving device, this information is used to create a new table (or object) on the receiving device with the same oid_id and oid_source with which it was created originally. In the same flow, these oid_id, oid_source and oid_ptr values are inserted into the RB trees or GB trees in the receiver-side database.

Figure 9:
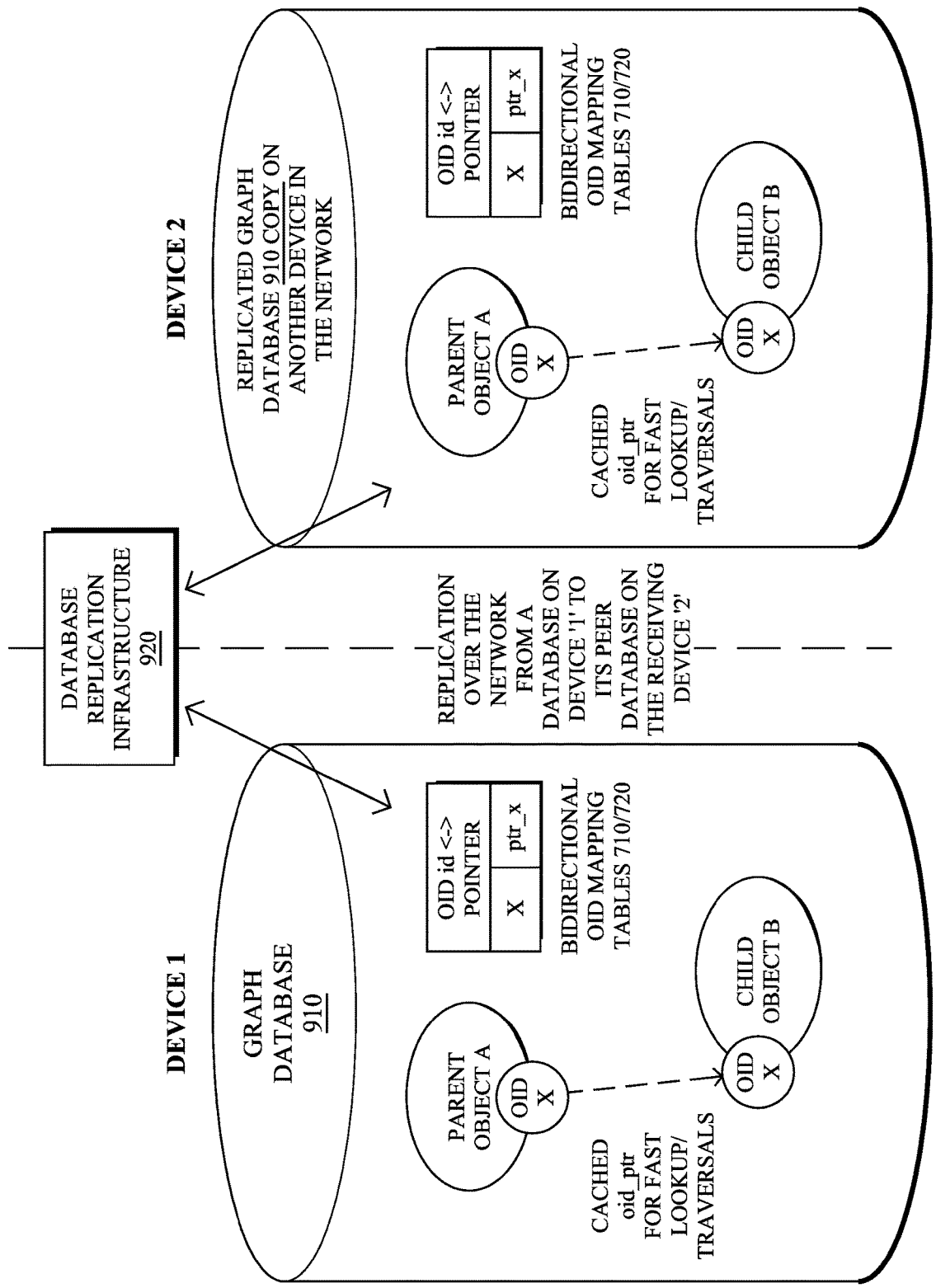
FIG. 9 illustrates an example of database replication.

FIG. 9 illustrates an example of the concepts described above, as well as database replication in particular. Specifically, in the system 900 shown in FIG. 9, a graph database 910 is illustratively maintained by device "1" (for simplicity, a single device is shown), where a parent object "A" has an OID "X" with a cached oid_ptr to the corresponding child object "B". Additionally, device 1 also maintains a bidirectional mapping (710/720) between the OIDs and pointers, as described above. Through the database replication infrastructure 920, the graph database 910 may be replicated to another device "2" (database 910-copy).

When the parent object is replicated to the receiver, the oid_id and oid_source that were cached in it are also sent over. These values are used to lookup the bidirectional OID mapping tables 710/720 (RB trees or GB trees) on the receiver and locate the child table or object to cache the reference to it in the parent object.

Note that if the replication scheme does not enforce any order in which updates are synced to peer devices, a parent could be received before the child or vice versa. If the parent is replicated before the child, a dummy mapping may be created for the child until it arrives, which is resolved as soon as it is received and inserted into the receiver's database. A similar mechanism is used to distribute any floating object (object not inserted into any user-defined table) in the database. The difference here is that all such objects that are referred to using OID's, are also inserted into a type-agnostic table that is synced to other devices in the network by the replication infrastructure.

This distribution mechanism makes it possible to distribute objects created on one device to other devices in a multi-chassis networking environment. It also means that in a large scale deployment of such devices managed by a controller, the controller can distribute configuration data (even data modeled using parent-child relationships) to the network elements (stacked switches and/or routers) that it manages, using these OID's and they will work transparently on the network elements. At the same time, the controller can also receive operational data updates from these switches and/or routers and use the same OID's as those that were created on these devices. Moreover, the fact that only 33 bytes (8 for oid_id+24 for oid_source+1 for oid_attr) are sent over the wire also results in considerable bandwidth savings, especially while running at scale.

Figure 10:
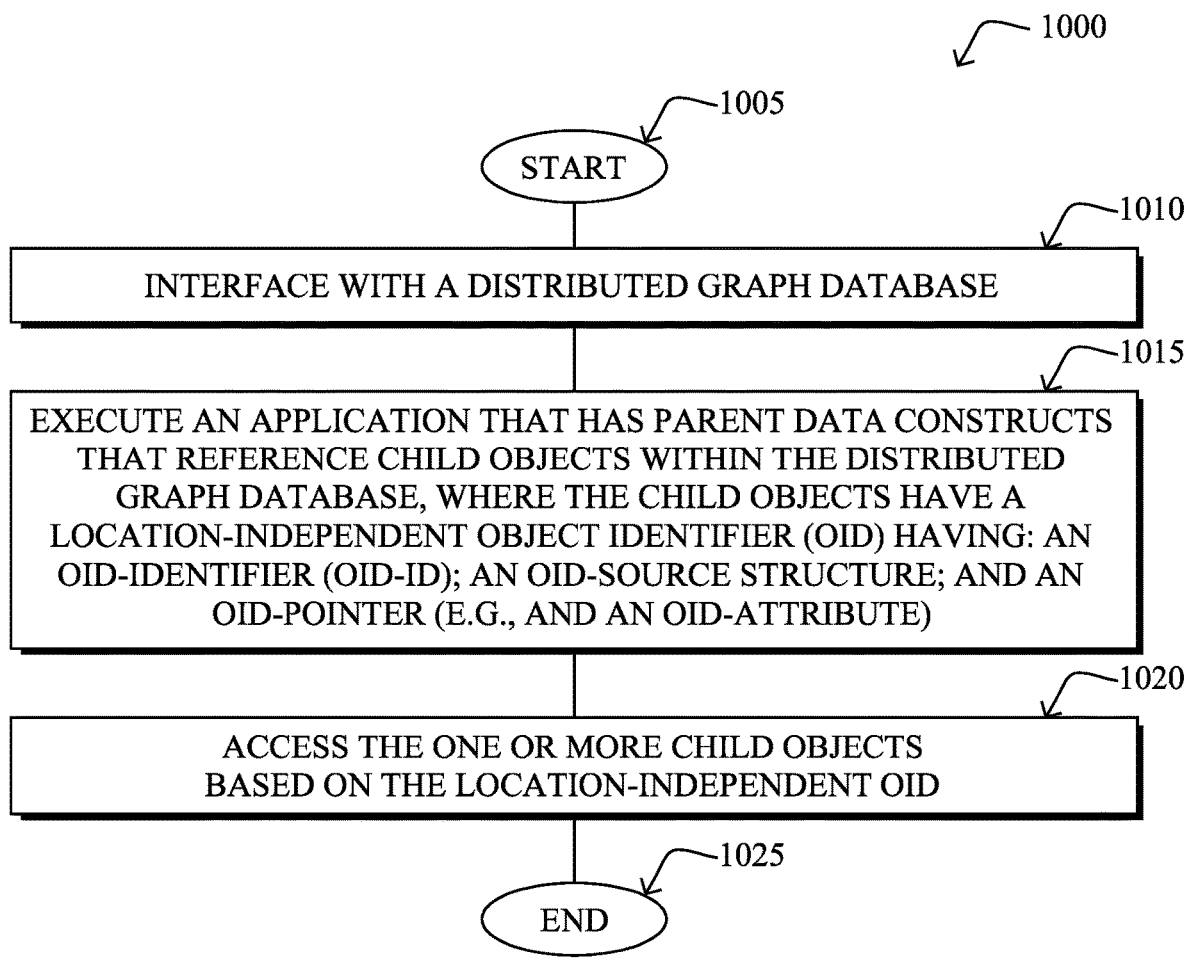
FIG. 10 illustrates an example simplified procedure for using network-wide location-independent object identifiers for high-performance distributed graph databases.

FIG. 10 illustrates an example simplified procedure for using network-wide location-independent object identifiers for high-performance distributed graph databases in accordance with one or more embodiments described herein. The procedure 1000 may start at step 1005, and continues to step 1010, where, as described in greater detail above, an operating system 242 on a computer device 200 (e.g., a network device operating system on a computer networking device) in a network 100 of computer devices (e.g., an enterprise network) interfaces with a distributed graph database 300 that is (generally, may be) distributed across the network of computer devices. In particular, in step 1015, the operating system executes an application that has one or more parent data constructs that reference one or more child objects within the distributed graph database as detailed above, where the one or more child objects each have a location-independent object identifier (OID) 400. Specifically, as described in detail above, a location-independent OID illustratively has:
  an OID-identifier (OID-ID) 410 assigned upon creation to each particular child object by a data source of the location-independent OID;
  an OID-source structure 420 that uniquely identifies the data source of the location-independent OID within the network of computer devices (for example, and as described above, one or more identifications such as a system identifier 421 of a multi-chassis stack, a chassis identifier 422 for an associated chassis within a multi-chassis stack, a unit (e.g., FRU) identifier 423 for computing unit within a chassis, a slot identifier 424 for a physical slot on a chassis, a bay identifier 425 for a physical bay on a chassis, a logical unit identifier 426 to identify a type of a corresponding child object, and an epoch 427 indicative of restarts);
  an OID-attribute 430 (optionally) that defines whether the particular child object is an object or a set of objects (e.g., table, list, array, matrix, etc.); and
  an OID-pointer 440 indicative of a relative location of the particular child object in a memory mapped region.

As mentioned above, lookup tables 710 or lookup trees 720 (e.g., red-black trees) provide bidirectional mapping from OID-ID and OID-source tuples to OID-pointer values, and the OID-pointer for a particular child object may be cached within a particular parent data construct referencing that particular child object.

In step 1020, the operating system may then access the one or more child objects based on the location-independent OID, as described above, and the illustrative and simplified procedure 1000 may end in step 1025. Notably, the procedure 1000 may continue to interface with the database, execute an application, and access the objects, without any specific operational order of the steps or any specific ending, and the procedure 1000 is merely an illustrative example of operating system functionality.

Figure 11:
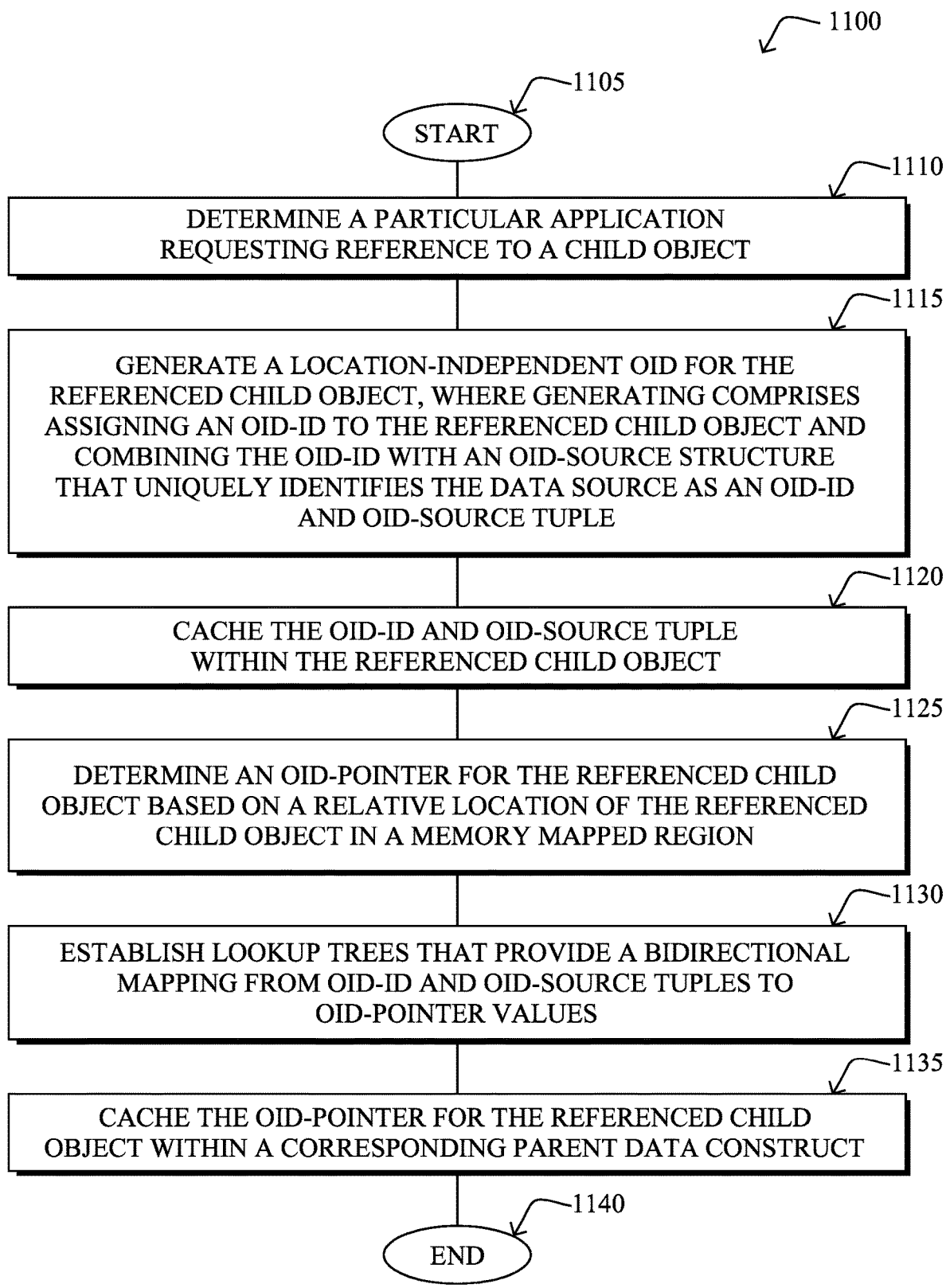
FIG. 11 illustrates an example simplified procedure for generating network-wide location-independent object identifiers for high-performance distributed graph databases.

In addition, FIG. 11 illustrates an example simplified procedure for generating network-wide location-independent object identifiers for high-performance distributed graph databases in accordance with one or more embodiments described herein. The procedure 1100 may start at step 1105, and continues to step 1110, where, as described in greater detail above, a particular application requests a reference to a (newly) referenced object. In step 1115, the corresponding data source for the referenced child object generates a particular location-independent OID for the newly referenced child object. (Notably, in one embodiment, step 1115 (and subsequent steps) is performed only in response to step 1110 occurring.) As described above, generating in step 1115 may comprise assigning a particular OID-ID to the newly referenced child object and combining the particular OID-ID with an OID-source structure that uniquely identifies the particular data source as an OID-ID and OID-source tuple.

In step 1120, the OID-ID and OID-source tuple may be cached within the newly referenced child object, and then a particular OID-pointer 610 for the newly referenced child object (based on a particular relative location of the newly referenced child object in a particular memory mapped region 600) is determined in step 1125. In step 1130, the OID-ID, OID-source, and OID-pointer information may be inserted into established bidirectional mapping trees (lookup trees or tables) that provide a bidirectional mapping from OID-ID and OID-source tuples to OID-pointer values. Accordingly, in step 1135, the OID-pointer for the newly referenced child object may be cached within a corresponding parent data construct referencing the newly referenced child object in step 1140. The illustrative and simplified procedure 1100 may then end in step 1145 for this particular referenced child object.

Figure 12:
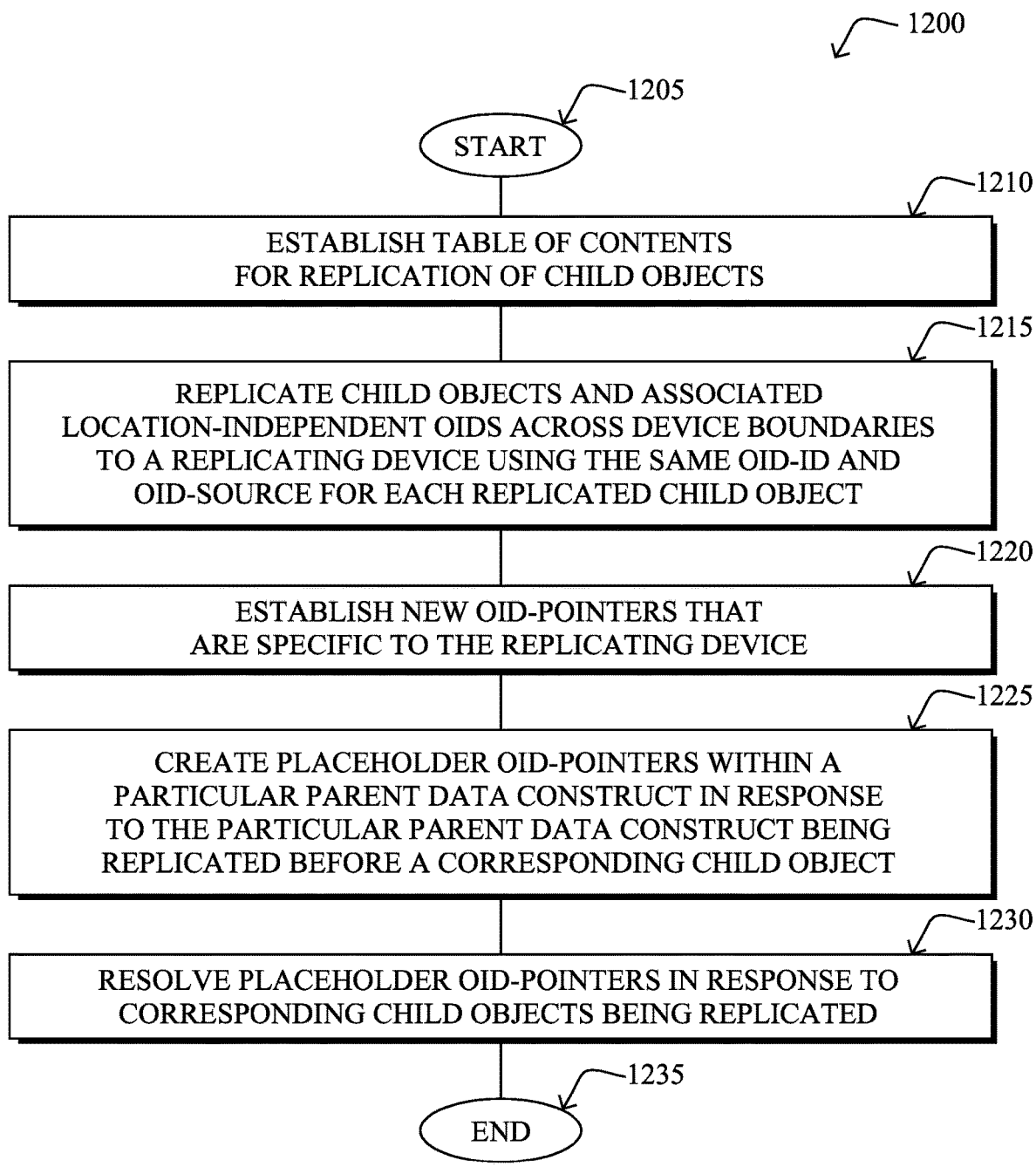
FIG. 12 illustrates an example simplified procedure for replicating network-wide location-independent object identifiers for high-performance distributed graph databases.

Lastly, FIG. 12 illustrates an example simplified procedure for replicating network-wide location-independent object identifiers for high-performance distributed graph databases in accordance with one or more embodiments described herein. The procedure 1200 may start at step 1205, and continues to step 1210, where, as described in greater detail above, a table of contents 800 may first be established for the replication of child objects (e.g., such that replicating may be performed based on the table of contents, as described above). In step 1215, child objects and associated location-independent OIDs may then be replicated across device boundaries to a replicating device using the same OID-ID and OID-source for each replicated child object as mentioned above. In step 1220, OID data may be inserted into the bidirectional mapping tables on the recipient device, where, in step 1225, placeholder OID mapping table entries may be created in the event of a particular parent data construct being replicated before its corresponding child object. Next, in step 1230, new OID-pointers are established that are specific to the replicating device when the child object is received. Any placeholder OID-pointers may then be resolved in step 1235 in response to the corresponding child object being replicated. The simplified procedure 1200 for databased replication may then end in step 1240.

It should be noted that while certain steps within procedures 1000-1200 may be optional as described above, the steps shown in FIGS. 10-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1200 are described separately, certain steps from each procedure may be incorporated into each other procedure, and the procedures are not meant to be mutually exclusive.

The techniques described herein, therefore, provide for modeling and replication of network-wide, location-independent object identifiers for high-performance distributed graph databases. In particular, the techniques herein, such as the OID infrastructure for in-memory graph databases described above, do not require a centralized ID generator, atomic broadcasts, or consensus algorithm. Each network device independently generates its own OID's, but these OID's will still work transparently on other switches (stacked or standalone), routers and also controllers in the same networking environment. In addition, the techniques herein provide a memory efficient encoding scheme for object references to make them easily portable, seamlessly interoperable and suitable for use in different layers of a customer's deployment. For example, the same scheme can be seamlessly used by, e.g., a controller talking to aggregation layer switches that in turn create their own state and replicate them southwards to access switches. Not only that, but the techniques herein provide a way to replicate and preserve hierarchical relationships that are in an in-memory graph database, across device boundaries, at scale, and perform almost as fast as direct pointer dereferences despite the schema layer not supporting pointer definitions. Moreover, the oid_id and oid_source encoding scheme makes it easy to filter and perform different operations on objects coming from different data sources, and OID's are assigned only to objects upon request, thereby the reducing memory and performance overhead of the database infrastructure significantly.

Notably, the techniques herein are differentiated from current systems for a variety of reasons. For instance, certain methods use strings to encode the identity of an object or resource, where typical lengths of these strings vary typically from around 200 bytes to about 2000 bytes or more. Strings are known to incur enormous overhead in terms of both performance and memory. Longer strings progressively degrade the overall system performance due to the longer time needed to process them. While these could be used to create unique identifiers for resources or objects across systems, they fail to meet the performance (speed) and memory requirements of highly specialized, high-performance network operating systems. The techniques herein, on the other hand, efficiently (both in terms of speed and memory) create and store object identifiers in graph databases in high-performance network operating systems. These database systems should also allow very fast traversals, searches and the transparent distribution of their constituent (uniquely identifiable) objects and relationships to databases on other networking devices at high scale. While these existing technologies fail to meet these expectations, the techniques herein surpass them at scale with a memory-efficient and bandwidth-efficient implementation.

Furthermore, the unique identity of the object encoded via the oid_id, oid_source tuple within a managed network of multi-chassis stacks of switches or routers makes it possible to generate objects on any database residing on any device (even a particular slot or bay), send it across to any other device and still be able to use and address it with the same tuple that it was assigned on the source. Thus, the OID is a location independent object identifier that can be distributed and transparently used on different multi-chassis systems in a customer's deployment. Moreover, the caching of the oid_ptr value enables extremely fast look-ups and traversals of objects and hierarchies in the graph database. Furthermore, as explained above, the replication of these OID's is also efficient in terms of memory and network bandwidth utilization.

Other systems may identify objects within an application (possibly on remote servers) using remote procedure calls (RPCs), and typically assign an identification (e.g., a globally unique identifier (GUID) regardless of whether it may be referenced by another object or application or not. Unlike the techniques described above, these sort of identification schemes do not scale at all for the problem space of having distributable and scalable object identifiers that must work in in-memory databases on highly memory-constrained platforms and yet simultaneously provide extremely quick access to the referred objects. Moreover, even if one were to use this model of generating and storing GUID's, a distributed consensus algorithm or the services of a centralized broker would still be required to reconcile objects from different devices, which still does not scale well at all in a deployment of high-speed network devices. The proposed OID model above, on the other hand, requires neither of these by virtue of the way the unique ID is encoded, and object OID's are only assigned and stored upon request by the application. These factors, combined with the pointer caching for fast lookups, allow the techniques herein to scale well for large network deployments and efficient for use in in-memory databases.

Further systems create object references that are entirely string based, where the value of an object reference is the entire path to the referred object. As an example, such a s system may include within the value:

a. The namespace in which the object resides (string).
  b. The class to which the object belongs (string).
  c. If the object is an instance, then the values of all its key properties expressed as a string.

String based operations are known to be expensive leading to reduced performance at scale. As opposed to this, OID's in the proposed model above present a memory-efficient alternative with exceptional performance at scale.

Further still, in certain federating systems, data may be distributed among Managed Data Resources (MDRs) which use their own identifiers (often based on hardware: e.g., MAC address, hostname, and serial number) to identify the data resource. Different MDR's can store a different subset of data about the same object or resource. As a result they can use different properties of their data subsets to form the complete resource identifier. Hence, these can often be text-based identifiers. The federating system thus tries to reconcile these identifiers from different MDR's to determine whether they belong to the same object/resource. It does this using a combination of automated analysis and manual intervention. The determination of final identity is thus seldom absolute and, very often, heuristic because of the fact that different MDR's know different characteristics of the same entity, thus establishing different sets of identifying properties for them (based on combinations of these characteristics). Furthermore, each MDR can also change an entity's identity even after it has been established if the values in the subset of data that it stores change.

As opposed to this, the techniques described herein do not perform sharding on the graph databases that run on our systems (a database shard is a horizontal partition of data in a database, generally held on a separate database server instance, e.g., to spread load). This gives immense benefits in terms of query performance, writes, and also replication. Identities (OIDs) are assigned to every table and database object which is being referred to using an OID. Moreover, once an identity is assigned to a table or an object, it remains unchanged for the entire lifecycle of the system unlike the fluctuating identifiers used in MDRs. This also obviates the complexity of having an identity reconciliation mechanism (let alone manual ones) or a distributed consensus algorithm. Once distributed, the OID holds its value even on remote nodes and thus can be used to filter or segregate data coming from different nodes in the distributed system described herein.

What further sets the techniques herein apart from other technologies is the ability to reconstruct objects, relationships, and thereby, the entire graph database just by using these identifiers. For example, consider a network controller managing several networking devices (e.g., using in-memory databases and the OID model above). The controller may be interested in knowing, for example, about the wireless configuration on each independent device in a wireless configuration database. In this case, all the controller has to do is subscribe to the table of contents (TOC) in this database. With each record of this table containing the OID's of the corresponding tables, the controller can now locally create and subscribe for updates on each of these tables. Objects coming from different devices are naturally unique due to the location information encoded into them, thus obviating the need for identity reconciliation on the controller. Subsequently, objects from different databases on different devices can be replicated on the controller's local databases thus re-forming their relationships with tables (that are replicated through the TOC) through the corresponding OID's that they (the objects) contain. Thus, the entire graph database can be created eventually in the controller's local database, all through the OID's stored in the TOC records. Similarly, objects created on the controller will have their own uniqueness and can be distributed to the switches and routers in the network.

While there have been shown and described illustrative embodiments, it is to be understood that various other adaptations and modifications may be made within the spirit and scope of the embodiments herein. For example, the embodiments have been shown and described herein using certain terminology and operating system references. However, the embodiments in their broader sense are not as limited, and may, in fact, be used with other types of operating systems, whether for computer networks or computing devices in general. In addition, while certain protocols may have been shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of embodiments herein.

What is claimed is:

1. A method, comprising:

interfacing, by an operating system on a computer device in a network of network devices, with a distributed graph database that is distributed across the network devices;

executing, by the operating system, an application that has one or more parent data constructs that reference one or more child objects within the distributed graph database, wherein the one or more child objects each have a location-independent object identifier (OID) that models hierarchical relationships between nodes in the distributed graph database on a plurality of networking devices interconnected by the network devices, the OID including:

an OID-identifier (OID-ID) assigned to each particular child object by a data source of the location-independent OID, an OID-source tupled to the OID-ID, the OID-source a pointer to a structure that uniquely identifies the data source of the location-independent OID within the network of network devices, wherein the OID source identifies a location of origin of the one or more child objects, and an OID-pointer indicative of a relative location of the particular child object in a memory mapped region, wherein lookup trees provide bidirectional mapping from OID-ID and OID-source tuples to OID-pointer values; and accessing, by the operating system, the one or more child objects based on the location-independent OID.

2. The method as in claim 1, wherein the lookup trees comprise one of either red-black trees or generalized balanced trees.

3. The method as in claim 1, further comprising:

generating, as a particular data source, a particular location-independent OID for a newly referenced child object, wherein generating comprises assigning a particular OID-ID to the newly referenced child object and combining the particular OID-ID with an OID-source that uniquely identifies the particular data source as an OID-ID and OID-source tuple;

caching the OID-ID and OID-source tuple within the newly referenced child object;

determining a particular OID-pointer value for the newly referenced child object based on a particular relative location of the newly referenced child object in a particular memory mapped region;

establishing lookup trees that provide a bidirectional mapping from the OID-ID and OID-source tuple to the particular OID-pointer value; and caching the particular OID-pointer value for the newly referenced child object within a corresponding parent data construct referencing the newly referenced child object.

4. The method as in claim 3, further comprising:
generating the particular location-independent OID only in response to a particular application requesting reference to the newly referenced child object.

5. The method as in claim 1, further comprising:
replicating a plurality of child objects and associated location-independent OIDs across device boundaries to a replicating device using the same OID-ID and OID-source tuple for each of the plurality of replicated child objects, wherein one or more new OID-pointers are established that are specific to the replicating device.

6. The method as in claim 5, further comprising:
establishing a table of contents for the replication of child objects, wherein replicating is performed based on the table of contents.

7. The method as in claim 5, further comprising:
creating a placeholder OID-pointer within a particular parent data construct in response to the particular parent data construct being replicated before a corresponding child object; and
resolving the placeholder OID-pointer in response to the corresponding child object being replicated.

8. The method as in claim 1, wherein the OID-source comprises one or more identifications selected from a group consisting of: a system identifier of a multi-chassis stack; a chassis identifier for an associated chassis within a multi-chassis stack; a unit identifier for a computing unit within a chassis; a slot identifier for a physical slot on a chassis; and a bay identifier for a physical bay on a chassis.

9. The method as in claim 8, wherein the group from which the identifications are selected from further consists of: a logical unit identifier to identify a type of a corresponding child object.

10. The method as in claim 1, wherein each location-independent OID further has an OID-attribute that defines whether the particular child object is an object or a set of objects.

11. The method as in claim 1, wherein the operating system is a network device operating system, and wherein the computer device is a computer networking device.

12. The method as in claim 1, wherein the network of network devices is an enterprise network.

13. A tangible, non-transitory, computer-readable media having software encoded thereon, the software, when executed by a processor on a computer device in a network of network devices, operable to:
interface with a distributed graph database that is distributed across the network of network devices;
execute an application that has one or more parent data constructs that reference one or more child objects within the distributed graph database, wherein the one or more child objects each have a location-independent object identifier (OID) that models hierarchical relationships between nodes in the distributed graph database on a plurality of networking devices interconnected by the network devices, the OID including:
an OID-identifier (OID-ID) assigned to each particular child object by a data source of the location-independent OID,
an OID-source tupled to the OID-ID, the OID-source a pointer to a structure that uniquely identifies the data source of the location-independent OID within the network of network devices, wherein the OID source identifies a location of origin of the one or more child objects, and
an OID-pointer indicative of a relative location of the particular child object in a memory mapped region, wherein lookup trees provide bidirectional mapping from OID-ID and OID-source tuples to OID-pointer values; and
access the one or more child objects based on the location-independent OID.

14. The computer-readable media as in claim 13, wherein the software, when executed, is further operable to:
generate, as a particular data source, a particular location-independent OID for a newly referenced child object, wherein generating comprises assigning a particular OID-ID to the newly referenced child object and combining the particular OID-ID with an OID-source that uniquely identifies the particular data source as an OID-ID and OID-source tuple;
cache the OID-ID and OID-source tuple within the newly referenced child object;
determine a particular OID-pointer value for the newly referenced child object based on a particular relative location of the newly referenced child object in a particular memory mapped region;
establish lookup trees that provide a bidirectional mapping from the OID-ID and OID-source tuple to the particular OID-pointer value; and
cache the particular OID-pointer value the newly referenced child object within a corresponding parent data construct referencing the newly referenced child object.

15. The computer-readable media as in claim 13, wherein the software, when executed, is further operable to:
replicate a plurality of child objects and associated location-independent OIDs across device boundaries to a replicating device using the same OID-ID and OID-source tuple for each of the plurality of replicated child objects, wherein one or more new OID-pointers are established that are specific to the replicating device.

16. The computer-readable media as in claim 13, wherein the OID-source comprises one or more identifications selected from a group consisting of: a system identifier of a multi-chassis stack; a chassis identifier for an associated chassis within a multi-chassis stack; a unit identifier for a computing unit within a chassis; a slot identifier for a physical slot on a chassis; and a bay identifier for a physical bay on a chassis.

17. The computer-readable media as in claim 13, wherein the software is executed by a network device operating system on a computer networking device.

18. An apparatus, comprising:
one or more network interfaces configured to communicate in a network of network devices;
a processor coupled to the network interfaces and adapted to execute one or more processes; and
a memory configured to store a process executable by the processor, the one or more processes when executed operable to:
interface with a distributed graph database that is distributed across the network of network devices;
execute an application that has one or more parent data constructs that reference one or more child objects within the distributed graph database, wherein the one or more child objects each have a location-independent object identifier (OID) that models hierarchical relationships between nodes in the distributed graph database on a plurality of networking devices interconnected by the network devices, the OID including:
an OID-identifier (OID-ID) assigned to each particular child object by a data source of the location-independent OID, an OID-source tupled to the OID-ID, the OID-source
a pointer to a structure that uniquely identifies the
data source of the location-independent OID
within the network of network devices, wherein
the OID source identifies a location of origin of
the one or more child objects, and an OID-pointer indicative of a relative location of the
particular child object in a memory mapped
region, wherein lookup trees provide bidirectional
mapping from OID-ID and OID-source tuples to
OID-pointer values; and access the one or more child objects based on the
location-independent OID.

19. The apparatus as in claim 18, wherein the OID-source comprises one or more identifications selected from a group consisting of: a system identifier of a multi-chassis stack; a chassis identifier for an associated chassis within a multi-chassis stack; a unit identifier for a computing unit within a chassis; a slot identifier for a physical slot on a chassis; and a bay identifier for a physical bay on a chassis.

20. The apparatus as in claim 18, the one or more processes when executed further operable to:

generate, as a particular data source, a particular location-independent OID for a newly referenced child object, wherein generating comprises assigning a particular OID-ID to the newly referenced child object and combining the particular OID-ID with an OID-source that uniquely identifies the particular data source as an OID-ID and OID-source tuple;

cache the OID-ID and OID-source tuple within the newly referenced child object;

determine a particular OID-pointer value for the newly referenced child object based on a particular relative location of the newly referenced child object in a particular memory mapped region;

establish lookup trees that provide a bidirectional mapping from the OID-ID and OID-source tuple to the particular OID-pointer value; and cache the particular OID-pointer value for the newly referenced child object within a corresponding parent data construct referencing the newly referenced child object.

* * * * *